United States Patent
Yuan et al.

(10) Patent No.: US 8,547,715 B2
(45) Date of Patent: Oct. 1, 2013

(54) APPARATUS AND METHOD FOR DC/AC SYSTEMS TO RIDE THROUGH GRID TRANSIENTS

(75) Inventors: Xiaoming Yuan, Hubei (CN); Zhuohui Tan, Shanghai (CN); Haiqing Weng, Shanghai (CN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/882,744

(22) Filed: Sep. 15, 2010

(65) Prior Publication Data

US 2011/0128760 A1   Jun. 2, 2011

(30) Foreign Application Priority Data

Nov. 27, 2009 (CN) .......................... 2009 1 0249850

(51) Int. Cl.
*H02M 7/515* (2007.01)
*H02M 7/5387* (2007.01)

(52) U.S. Cl.
USPC ........... 363/98; 363/56.05; 363/124; 323/906

(58) Field of Classification Search
USPC .................. 363/55, 56.01, 56.02, 56.05, 95, 363/97, 98, 124; 323/906; 361/91.1
See application file for complete search history.

(56) References Cited

U.S. PATENT DOCUMENTS

| | | | | |
|---|---|---|---|---|
| 4,651,266 A | * | 3/1987 | Fujioka et al. | 363/39 |
| 5,014,177 A | * | 5/1991 | Nuechterlein | 363/45 |
| 5,710,699 A | * | 1/1998 | King et al. | 363/132 |
| 6,043,996 A | * | 3/2000 | Kumar | 363/41 |
| 6,339,538 B1 | * | 1/2002 | Handleman | 363/95 |
| 7,193,872 B2 | * | 3/2007 | Siri | 363/95 |
| 7,423,412 B2 | | 9/2008 | Weng et al. | |
| 7,439,714 B2 | * | 10/2008 | Llorente Gonzalez et al. | 322/24 |
| 7,514,907 B2 | | 4/2009 | Rajda et al. | |
| 7,855,906 B2 | * | 12/2010 | Klodowski et al. | 363/97 |
| 7,952,897 B2 | * | 5/2011 | Nocentini et al. | 363/41 |
| 2002/0085397 A1 | | 7/2002 | Suzui et al. | |
| 2007/0133241 A1 | | 6/2007 | Mumtaz et al. | |
| 2008/0093853 A1 | | 4/2008 | Barker et al. | |
| 2011/0013432 A1 | * | 1/2011 | Wagoner | 363/95 |

FOREIGN PATENT DOCUMENTS

EP   0756372 A1   1/1997

OTHER PUBLICATIONS

EP Search Report and Opinion dated May 21, 2012 from corresponding EP Application No. 10191343.2.

* cited by examiner

*Primary Examiner* — Gary L Laxton
(74) *Attorney, Agent, or Firm* — Peter T. DiMauro; Global Patent Operation

(57) ABSTRACT

A converter system comprises a DC to AC converter, a maximum power point tracking device, and an array-side control. The DC link converts DC from a photovoltaic array to AC for a grid. The maximum power point tracking device is coupled to the array. The array-side control, which is coupled to the DC to AC converter and the device, prevents overvoltage in the DC bus of the DC to AC converter using array voltage and current data from the device and DC bus voltage data from the DC to AC converter during a grid transient by adjusting a maximum power point of the array to increase array voltage.

8 Claims, 8 Drawing Sheets

APPARATUS AND METHOD FOR DC/AC SYSTEMS TO RIDE THROUGH GRID TRANSIENTS

FIELD OF THE INVENTION

The subject matter disclosed herein relates to solar inverters (also referred to herein as a DC/AC System or a DC/AC Converter System) and more particularly, but not exclusively, to an apparatus and method for solar inverters to ride through grid transients.

BACKGROUND OF THE INVENTION

Many countries now or may soon require that photovoltaic (PV) arrays used as electric generation facilities stay connected with the electric grid when the grid is in fault. Remaining connected during a fault (also referred to as a transient, such as a low voltage ride through (LVRT) or zero voltage ride through (ZVRT)) can be challenging from an engineering perspective.

Conventional DC/AC systems, which convert DC from the array to AC for the grid, are subject to damage if an array remains connected to the grid during a LVRT or ZVRT due to overvoltage in a DC link of the DC/AC system. A PV-side converter will pump energy in to the DC link while grid-side will have reverse power from the grid due to the large transient.

Accordingly, a new system and method are needed for a PV array to remain connected to an electricity grid during a transient without suffering damage.

BRIEF DESCRIPTION OF THE INVENTION

Embodiments of the invention enable a PV array to remain connected to an electricity grid during a transient without suffering damage. In an embodiment, a converter system, comprises: a DC to AC converter that converts DC from a photovoltaic array to AC for a grid; a maximum power point tracking device coupled to the array; and an array-side control, coupled to the DC to AC converter and the device, that prevents overvoltage in the DC link of the DC to AC converter using array voltage and current data from the device and voltage data from the DC link during a grid transient by adjusting an operating power point of the array to increase array voltage.

In an embodiment, a method for preventing overvoltage in a DC link of photovoltaic array during a grid transient, comprises: receiving voltage data from the DC link; receiving voltage and current data from the array; and preventing overvoltage in the DC link using DC link voltage data and array voltage data during a grid transient by adjusting an operating power point of the array using an array-side command to increase array voltage.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE INVENTION

The following description is provided to enable any person having ordinary skill in the art to make and use the invention, and is provided in the context of a particular application and its requirements. Various modifications to the embodiments will be readily apparent to those skilled in the art, and the principles defined herein may be applied to other embodiments and applications without departing from the spirit and scope of the invention. Thus, the present invention is not intended to be limited to the embodiments shown, but is to be accorded the widest scope consistent with the principles, features and teachings disclosed herein.

Embodiments of the invention provide a system and method for a PV array to remain connected to an electricity grid during a fault by using a DC over voltage regulator to use a PV-side converter to help prevent overvoltage in a DC link during grid fault by changing the current, voltage or power demand command of a PV-side converter dynamically. One embodiment uses the PV-side converter to control DC voltage during grid fault, and uses the grid-side converter to follow Maximum Power Point Tracking (MPPT) commands but within the current rating limit. When a PV array does not have a series connected diode, the DC over voltage regulator can be tuned to supply part of energy back to the PV array to prevent DC overvoltage in the DC link. A brake-chopper can be added to the DC link/PV side/AC grid-side to prevent DC overvoltage.

Figure 1:
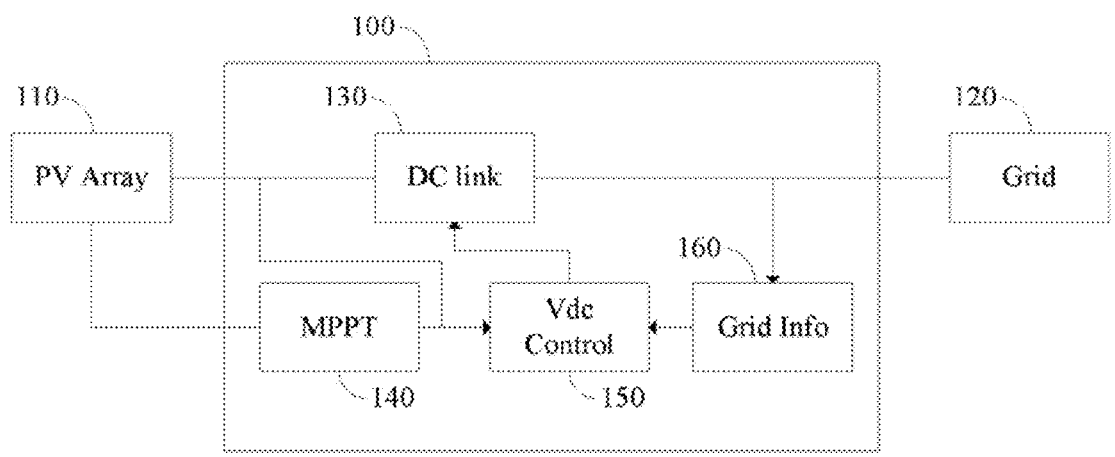
FIG. 1 is a diagram illustrating a converter system according to an embodiment of the invention.

FIG. 1 is a diagram illustrating a DC/AC system according to an embodiment of the invention. The system of FIG. 1 includes a Converter System 100 electrically coupled to a PV array 110 and an electricity grid 120. The apparatus 100 includes a DC to AC converter 130, MPPT device 140, Vdc Control 150, and Grid Information detector 160.

The DC to AC converter 130 receives DC electricity from the PV array 110 and converts it to AC current for upload to the grid 120. The MPPT 140 tracks the maximum power point of the array 110 via voltage and current feedback from the array 110 and generates a PV-side reference current or voltage for the Vdc control 150. The MPPT 140 can be implemented as an Application Specific Integrated Circuit (ASIC), software, and/or other technology. The Vdc control 150 receives grid info (frequency and/or phase) from the detector 160 and then controls the DC to AC converter 130 of the DC/AC converter system 100 accordingly to avoid over voltage during grid transients.

During operation, in contrast to a conventional system, DC voltage control comes from both grid-side and PV-side. Accordingly, during a grid 120 transient, the Vdc control 150 prevents overvoltage by properly controlling energy into the DC to AC Converter 130 of the converter system 100 and the system 100 can remain connected to the grid 120. Operation of the system 100 will be described in more detail in conjunction with the other figures below.

Figure 2:
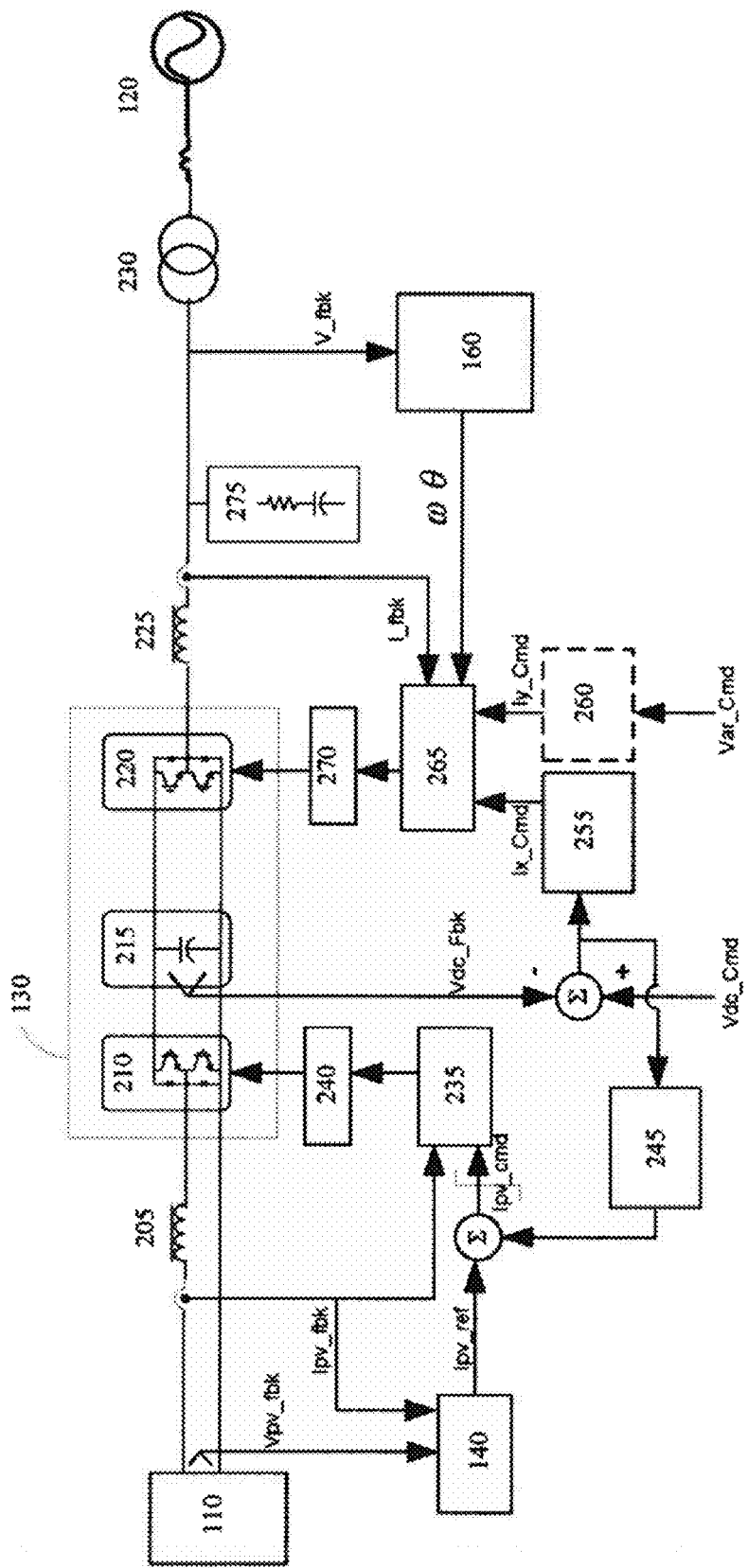
FIG. 2 is a diagram illustrating a PV converter system according to an embodiment of the invention.

FIG. 2 is a diagram illustrating a PV-side converter system according to an embodiment of the invention. The system is shown as a single phase for ease of illustration but can also be a three phase in an embodiment of the invention. The system maintains DC voltage at approximately at a constant level in the DC to AC Converter 130 by adjusting PV side power down when grid side power decreases. This is because, during a grid fault, a grid side converter (e.g., line converter 220 discussed below) may be not able to upload power to the grid 120, and in this case, PV-side input power to DC to AC Converter 130 needs to be lowered to balance the power flow from the PV array 110 to the DC to AC Converter 130 and to the grid 120. Otherwise, DC capacitor 215 will be charged and overvoltage occurs.

The system comprises, in one embodiment, the PV array 110 coupled to the grid 120 via, in series, a DC filter 205 to prevent DC current ripple, a boost converter 210, a DC capacitor 215, a line converter 220, a line inductor 225, and a transformer 230. The boost converter 210, DC capacitor 215, and line converter 220 form the DC to AC Converter 130 that converts DC current from the PV array 110 to AC current to the grid 120. Aft of the line inductor 225, a distortion filter 275 may reduce any distortion (e.g., cancel high frequency harmonics) in the current before being transmitted to the grid 120 by the transformer 230.

The system of FIG. 2 also includes a MPPT 140 and DC overvoltage regulator 245, both of which are coupled to an adder that feeds a current command to a PV current regulator 235, which in turn is coupled to a modulator 240, which is connected to the boost converter 210. The MPPT 140 receives voltage and current feedback from the PV array 110. The PV current regulator 235 also receives the current feedback from the array 110. On the grid side, a grid information detector 160 detects grid phase and/or frequency data and feeds the same to a current regulator 265, which also receives current feedback after current is converted from the DC to AC Converter 130. The current regulator 265 also receives a current command from a DC voltage regulator 255 and an optional VAR regulator 260. Voltage feedback from the DC capacitor 215 feeds into an adder, which also then goes to the DC voltage regulator 255 and the DC overvoltage regulator 245. The DC voltage regulator 255 and DC overvoltage regulator 245 form Vdc control 150 (FIG. 1) in this embodiment.

During operation, the MPPT 140 adjusts the array 110 voltage and current to achieve the maximum power available by commanding the PV current regulator 235 accordingly. In addition, to prevent overvoltage during a transient, the DC overvoltage regulator 245 uses the PV-side regulator 235 to prevent DC over-voltage and protect the system 100. The regulator 245 receives input of the difference between Vdc limit (maximum voltage) and Vdc feedback (voltage through the DC Capacitor 215). The DC overvoltage regulator 245 will decrease the current command of the PV-side regulator 235 when the DC bus voltage of the DC to AC Converter 130 is above a certain threshold by adding a current compensation signal to the original signal from the MPPT 140. If the PV array 110 does not allow reverse power, by adding a limiter (with lower limit equal to 0) on the PV-side current command (Ipv_Cmd), the PV-side boost converter 210 will stop pumping power into the DC to AC Converter 130 thereby keeping voltage across the DC Capacitor 215 constant or at least within its normal operating range. That is, the limiter clamps the reference of the current regulator 235 to zero. If the PV array 110 allows reverse power, this regulator 245 will set the PV-side regulator 235 current command to negative so that PV array 110 is also used to help prevent DC overvoltage.

In addition, the grid-side current regulator 265 regulates current so that the current from the DC to AC converter 130 matches frequency and/or phase as detected by the grid information detector 160 before being fed into the transformer 230 and then to the grid 120. The optional VAR regulator 260 regulates reactive power, if needed.

Figure 3:
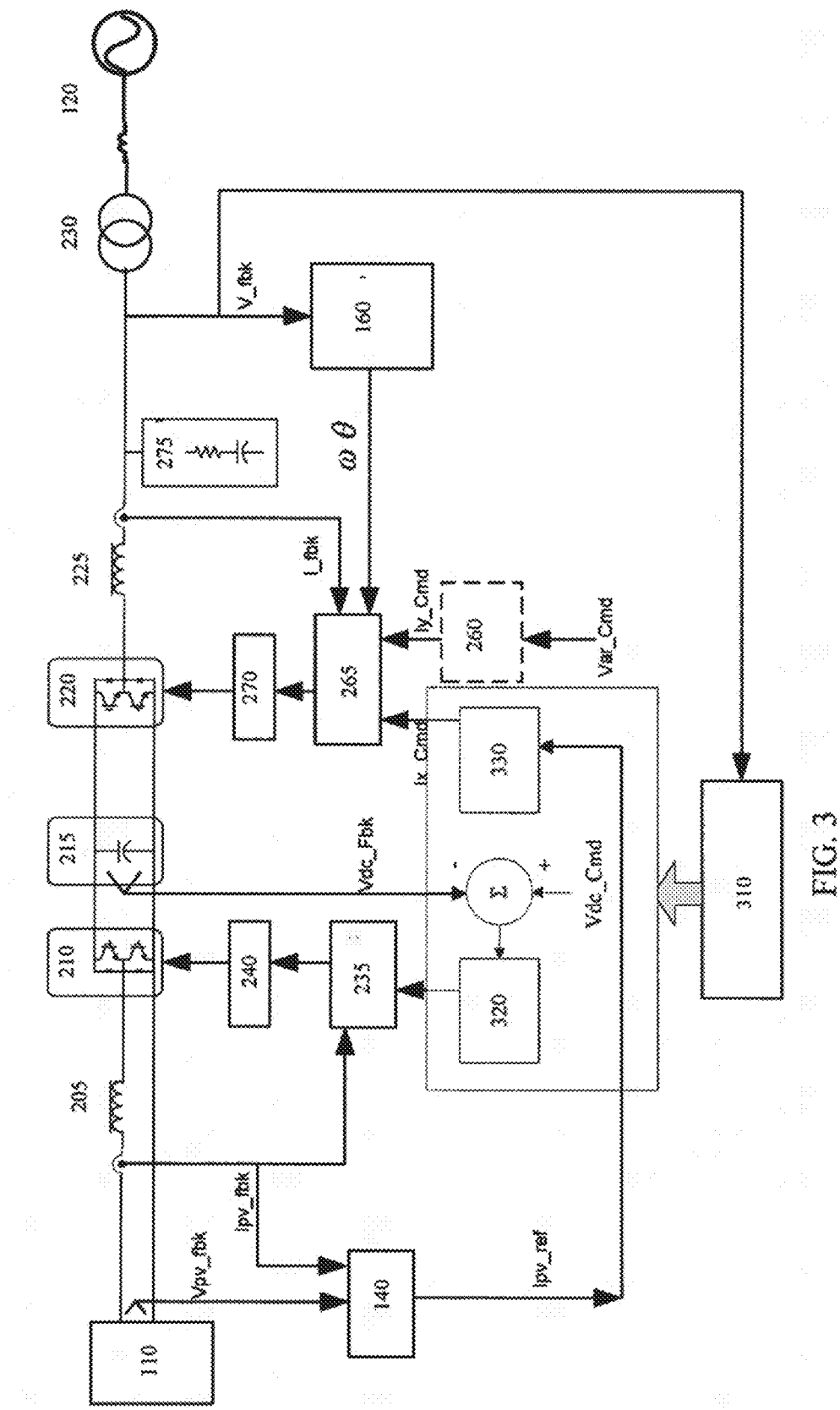
FIG. 3 is a diagram illustrating a PV converter system according to an embodiment of the invention.

FIG. 3 is a diagram illustrating a PV-side converter system according to an embodiment of the invention. The system disclosed in FIG. 3 is substantially similar to the system of FIG. 2 except that a grid fault detection block 310 feeds grid fault data to a DC voltage regulator 320, adder and grid-side current command calculator 330 in place of the DC overvoltage regulator 245 and DC voltage regulator 255. The Vdc control 150, in this embodiment, includes the DC voltage regulator 320. The system increases PV side voltage using a current command when grid side power (and therefore voltage) decreases due to a transient.

During normal operation, MPPT 140 generates a PV-side current reference current command (Ipv_ref), which is fed into current command calculator 330 to calculate grid side active current command (IxCmd) according to the voltage of the PV array 110 and the voltage of the grid 120; and in turn fed into grid side current regulator 265 for regulating active power into the grid 120. The difference between Vdc command and feedback is fed into a DC voltage regulator 320. The output of the DC voltage regulator 320 is in turn fed into PV-side current regulator 235 to adjust the current of the PV array 110 and eventually regulate the power from the PV array 110 to the DC to AC Converter 130 and maintain the DC bus voltage (voltage across the DC capacitor 215) at a certain level.

The grid fault detection block 310 receives voltage feedback from the grid 120 and notifies the regulator 320 and calculator 330 of any transient event. During a transient event, the DC capacitor 215 voltage goes up and the DC voltage regulator 320 reduces its output causing the PV current regulator 235 to limit current from the PV array 110 to the boost converter 210 (i.e., reduced or even zero power from the PV array 110 to the DC to AC converter 130). The current command calculator 330 limits current output from the line converter 220 based on signal from the MPPT 140 to ensure the current output from the line converter 220 does not exceed the system's capabilities.

Figure 4:
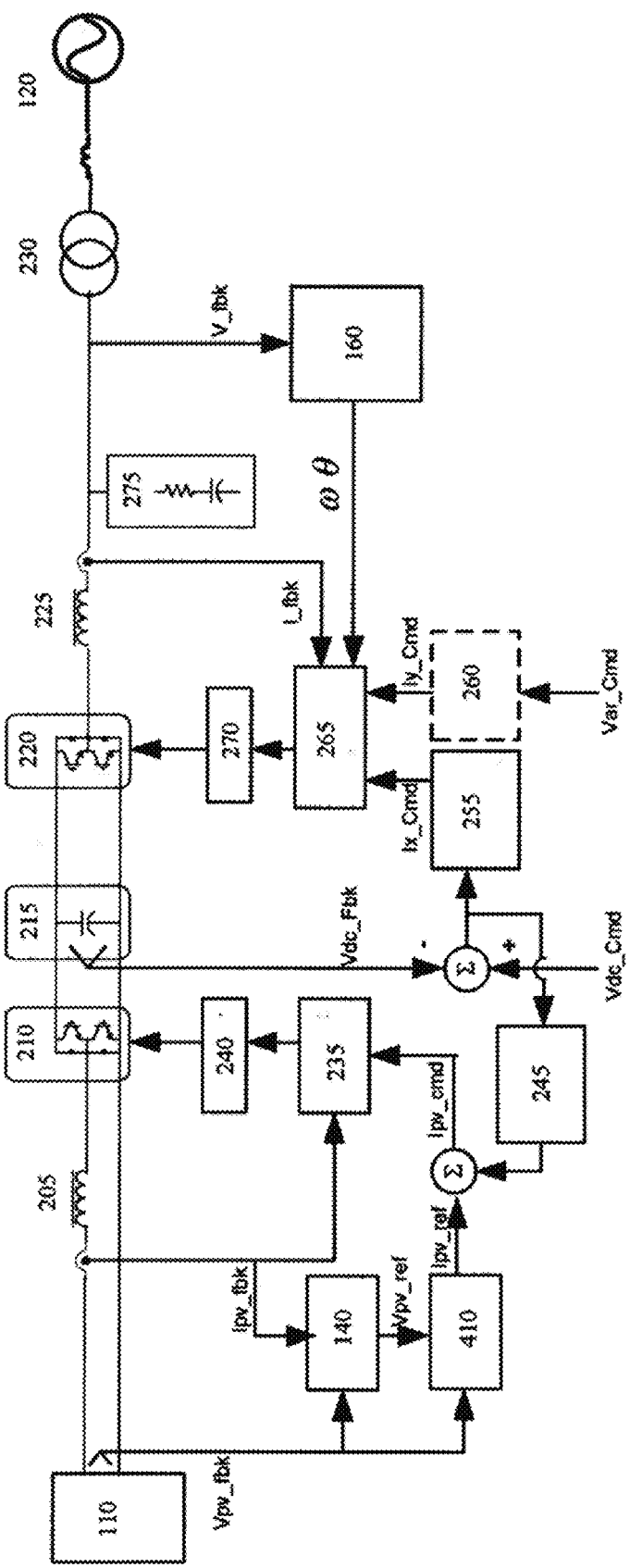
FIG. 4 is a diagram illustrating a PV converter system according to an embodiment of the invention.

FIG. 4 is a diagram illustrating a PV-side converter system according to an embodiment of the invention. The system of FIG. 4 is similar to the system of FIG. 2 except that a PV voltage regulator 410 is included that receives voltage feedback from the PV array 110 and a reference voltage from the MPPT 140 instead of directly feeding a current command to the regulator 235. The PV voltage regulator 410 in conjunction with the DC overvoltage regulator 245, through an adder, generates a current command for the PV current regulator 235, which adjusts current at the boost converter 210. As in the system of FIG. 2, in order to prevent DC overvoltage, the operating power point is decreased but controlled by the PV voltage regulator 410 issuing a current command to the current limit calculator 330 instead of directly by the PV current regulator 235. Vdc control 150, in this embodiment, includes the regulators 255 and 245.

Figure 5:
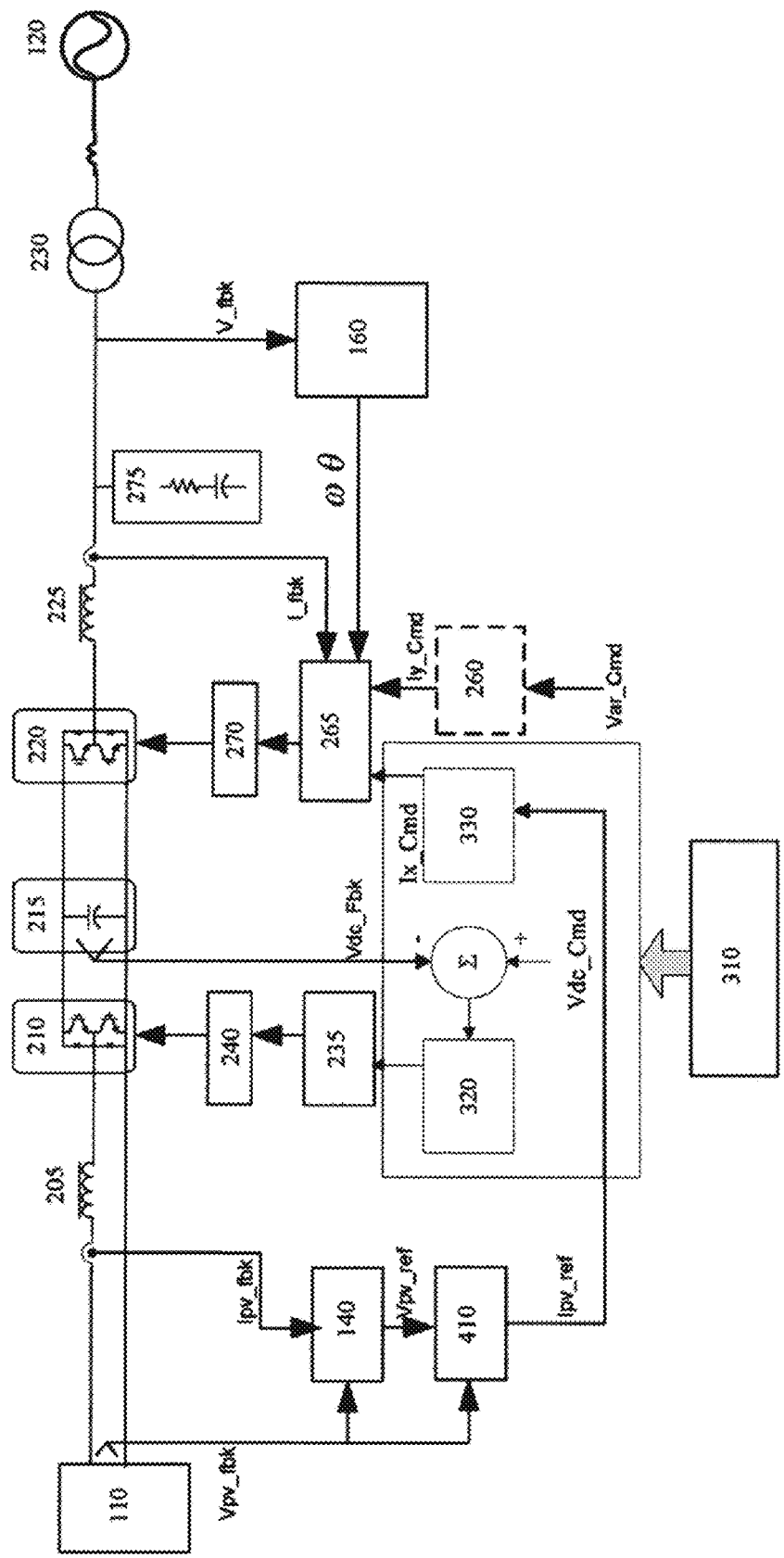
FIG. 5 is a diagram illustrating a PV converter system according to an embodiment of the invention.

FIG. 5 is a diagram illustrating a PV-side converter system according to an embodiment of the invention. The system of FIG. 5 is similar to the system of FIG. 3 except that a PV voltage regulator 410, as in FIG. 4, uses a volt command from the MPPT 140 to decrease the operating power point to prevent DC overvoltage during a transient The Vdc control 150 in the embodiment of FIG. 5 comprises the DC voltage regulator 320.

Figure 6:
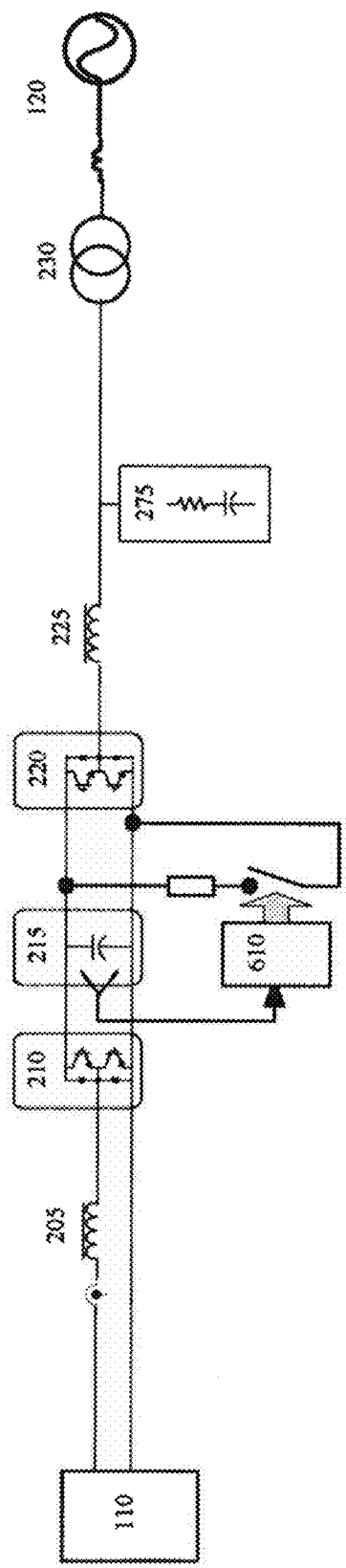
FIG. 6 is a diagram illustrating a DC brake chopper according to an embodiment of the invention.

FIG. 6 is a diagram illustrating a DC brake chopper according to an embodiment of the invention. A DC overvoltage detector 610 monitors DC-link voltage. If DC capacitor 215 voltage exceeds a threshold set below its voltage rating, the detector 610 will send out a turn-on signal to close the switch in the chopper circuit; while DC-link voltage is within the normal operating range, the switch in the chopper circuit turns off. Additional components can be added to the system of FIG. 6 but are not shown for purposes of clarity.

Figure 7:
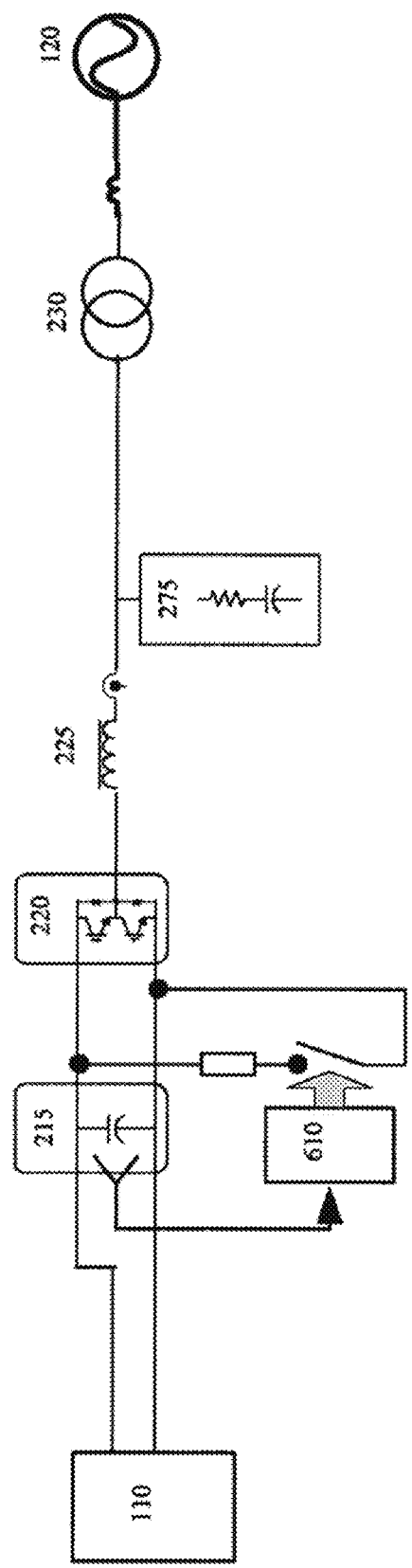
FIG. 7 is a diagram illustrating a DC brake chopper according to an embodiment of the invention.

FIG. 7 is a diagram illustrating a DC brake chopper according to an embodiment of the invention. The system of FIG. 7 is similar to FIG. 6 except that it does not include a boost converter 210. Additional components can be added to the system of FIG. 7 but are not shown for purposes of clarity.

Figure 8:
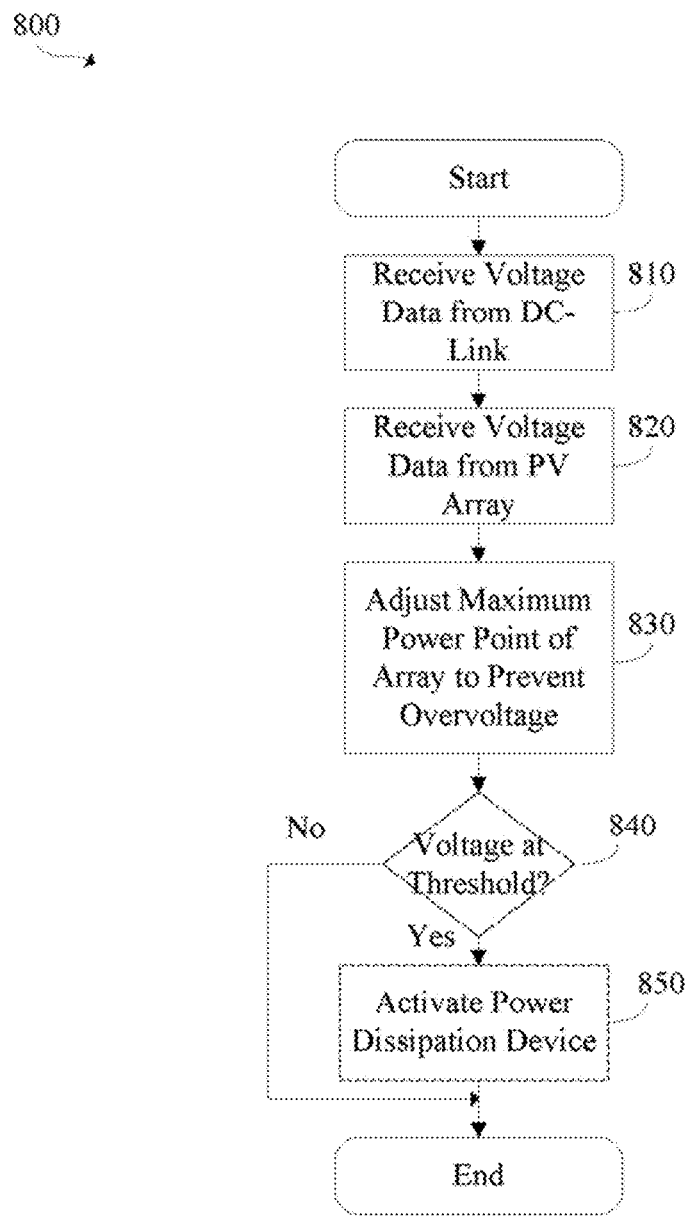
FIG. 8 is a flowchart illustrating a method of preventing overvoltage in a DC link during a grid transient.

FIG. 8 is a flowchart illustrating a method 800 of preventing overvoltage in a DC to AC converter during a grid transient. The method 800 includes receiving (810) DC bus voltage data in the DC to AC converter 130; receiving (820) voltage data from the PV array 110; and adjusting (830) the operating power point of the array 110 using the received voltage data to avoid overvoltage in the in the DC to AC converter 130. The adjusting (830) uses a PV-side current, voltage or power demand command of a PV-side converter. The adjusting (830) can be accomplished according to any of the embodiments described above. In an embodiment, if (840) the DC bus voltage in the DC to AC converter 130 still hits a threshold below its voltage rating, the overvoltage detector 610 will activate (850) a power dissipation device, e.g. a brake chopper, in the DC to AC converter 130 to prevent overvoltage.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A converter system, comprising:
   a DC to AC converter to convert DC from a photovoltaic array to AC for a grid;
   a maximum power point tracking device coupled to the array;
   an array-side controller, coupled to the DC to AC converter and the device, to prevent overvoltage in the DC bus of the DC to AC converter using array voltage and current data from the device and voltage data from the DC to AC converter during a grid transient by adjusting the operating power point of the array to increase array voltage;
   wherein the array-side controller includes
   a current regulator to adjust current in the DC to AC converter, based on a current command from the maximum power point tracking device and on a current feedback from the photovoltaic array; and
   a DC overvoltage regulator that receives DC bus voltage data from the DC to AC converter and feeds a current command to said current regulator.

2. The system of claim 1, wherein the overvoltage regulator is configured to clamp a reference of the current regulator to zero if the array does not allow reverse power when the DC bus voltage of the DC to AC converter exceeds a voltage capacity of the DC to AC converter.

3. The system of claim 1, wherein the overvoltage regulator is configured to set the current regulator to issue a negative current command if the array allows reverse power.

4. The system of claim 1, wherein the controller includes a voltage regulator to adjust current in the DC to AC converter based on a voltage command from the device.

5. The system of claim 1, wherein the controller includes a DC voltage regulator; and the device is configured to issue a voltage command to decrease the operating power point of the array.

6. The system of claim 1, wherein the DC to AC converter comprises a DC capacitor and a line converter coupled in series and wherein the system further comprises an over voltage detector to activate a power dissipation device if voltage from the DC capacitor exceeds a threshold below the DC bus voltage rating of the DC to AC converter.

7. The system of claim 6, wherein the power dissipation devices includes a brake chopper.

8. A converter system, comprising:
   a DC to AC converter to convert DC from a photovoltaic array to AC for a grid;
   a maximum power point tracking device for coupling to a photovoltaic array;
   an array-side controller, coupled to the DC to AC converter and the maximum power point tracking device, to prevent overvoltage in the DC bus of the DC to AC converter using array voltage and current data from the maximum power point tracking device and voltage data from the DC to AC converter during a grid transient by adjusting the operating power point of the array to increase array voltage;
   wherein the array-side controller includes a DC voltage regulator;
   wherein the DC to AC converter includes a grid-side converter that regulates active power into a grid according to maximum power of the photovoltaic array;
   and wherein the converter system further comprises a current limit calculator, coupled to the maximum power point tracking device, to limit current output from the grid-side converter.

* * * * *